United States Patent
Andersen et al.

[11] Patent Number: 6,141,915
[45] Date of Patent: Nov. 7, 2000

[54] FIRE RESISTANT BUSHING FOR CABLES, PIPES AND CHANNELS

[76] Inventors: Terje Andersen, Bakkeveien 1B, N-3055 Krokstadelva; Ole A Eide, N-6628 Meisingset, both of Norway

[21] Appl. No.: 09/000,464

[22] PCT Filed: Aug. 22, 1996

[86] PCT No.: PCT/NO96/00209

§ 371 Date: Feb. 3, 1998

§ 102(e) Date: Feb. 3, 1998

[87] PCT Pub. No.: WO97/08485

PCT Pub. Date: Mar. 6, 1997

[30] Foreign Application Priority Data

Aug. 23, 1995 [NO] Norway ................................. 953301
Jan. 5, 1996 [NO] Norway ................................. 960046

[51] Int. Cl.⁷ ................................. F16L 5/04; E04B 1/62
[52] U.S. Cl. ................................. 52/1; 52/219; 52/220.8; 52/232
[58] Field of Search ................................. 52/232, 220.8, 52/219, 1

[56] References Cited

U.S. PATENT DOCUMENTS

| | | |
|---|---|---|
| 4,424,867 | 1/1984 | Mallow . |
| 4,646,486 | 3/1987 | Hauff ................................. 52/232 X |
| 4,751,031 | 6/1988 | Baars ................................. 52/232 X |
| 4,848,043 | 7/1989 | Harbeke ................................. 52/232 X |
| 5,129,201 | 7/1992 | Robertson et al. ................................. 52/232 |
| 5,351,448 | 10/1994 | Gohlke et al. ................................. 52/232 X |

FOREIGN PATENT DOCUMENTS

| | | |
|---|---|---|
| 0486299 | 5/1992 | European Pat. Off. . |
| 0635665 | 1/1995 | European Pat. Off. . |
| 2947593 | 6/1981 | Germany . |
| 3620234 | 12/1987 | Germany . |
| 175458 | 7/1994 | Norway . |
| 404243 | 9/1978 | Sweden . |
| 459021 | 5/1989 | Sweden . |
| 2203900 | 10/1988 | United Kingdom . |

*Primary Examiner*—Robert Canfield
*Attorney, Agent, or Firm*—Venable; George H. Spencer; Catherine M. Voorhees

[57] ABSTRACT

A fire insulating support means for installation of one of cables, pipes and ventilation ducts in a through aperture in a wall includes a flange-shaped body. The flange-shaped body is made of a platelike member and a tubular member which has an aperture therethrough for the placement of a duct, pipe or cable. The flange-shaped body includes a fire insulating material, the platelike member in the flange-shaped body is provided with at least one through hole for fastening means for securing the body to the wall and at least partway around the at least one through hole is disposed a thermally expanding mat.

15 Claims, 3 Drawing Sheets

FIRE RESISTANT BUSHING FOR CABLES, PIPES AND CHANNELS

BACKGROUND OF THE INVENTION

The present invention relates to fire insulating support means for cables, pipes, ventilation ducts, and the like, for installation in a through aperture in a wall or similar structure, which support means comprises a flange-shaped body, which flange-shaped body comprises a platelike member and a tubular member, and which flange-shaped body has an aperture therethrough for the placement of a duct, pipe or cable.

In buildings, ships and oil platforms there are a number of requirements relating to the fire-insulating properties of support means for cables, pipes, ventilation ducts, etc., passing through walls and floors, to prevent the spread of a possible fire through the passage. To comply with these requirements, there are known a number of solutions for devices for passing elongate members through walls and floors to prevent heat and gas from a fire on one side of the wall or floor from being transmitted through the opening into the adjacent rooms.

Known from GB 2203900 A are a method and a device for passing cables through a partition. The device consists of a platelike fire retardant member having a hole therethrough and an integral, tubular extension which extends into a through aperture in a wall or similar structure. The platelike member is positioned on the outside of a wall or similar structure and covers an aperture through the wall. Between the tubular extensions and the walls of the aperture is inserted a carbon or ceramic packing material.

Norwegian patent 175458 shows a device for passing cables through a wall or similar structure which consists of a steel pipe installed in a fireproof mounting through the wall. Projecting from at least one side thereof is a pipe end, on the inside of which pipe end is applied a thin layer of thermally expanding material. To prevent ventilation through the pipe during an early phase of a fire, until the material has expanded, a sealing means is provided in at least one end of the pipe, preferably in the form of a mineral wool plug.

From SE-B 459021 there is known a fire retardant device for a pipe of meltable material, extending through a wall, which device comprises a sleeve of an essentially heat resistant material, which sleeve is positioned on the wall around at least a portion of the pipe that passes through an aperture in the sleeve, and which envelops a mass of material which intumesces on reaching fire temperature. The device further comprises a barrier of fire resistant material, which is displaceable in the longitudinal direction of the pipe, and a device responsive to the intumescent material which causes the barrier to close the opening in the sleeve when the pipe melts.

From U.S. Pat. No. 4,424,867 is known a thermal hardening sealing gel for flexible couplings. A pipe passing through an aperture in a wall or similar structure is enclosed by a sleeve surrounding the portion of the pipe that passes through the wall. Between this sleeve and the pipe is inserted an intumescent gel. In the event of a fire, the gel in the sleeve will intumesce and prevent the spread of the fire through the opening.

DE laid-open publication 3620234 describes a sealing system for the support means for pipes passing through an aperture in a wall, where a tubular sleeve having couplings at each end is positioned in a through aperture in a wall or the like, and where between the sleeve and the pipe is inserted an insulating material. The purpose of this sealing system is to protect the pipe against corrosion.

From SE-B 404243 is known a heat retardant device for a pipe of meltable material, which extends through a wall. The device consists of a sleeve made of a heat resistant material which is positioned on the wall around at least a portion of a pipe passing through the aperture. The sleeve envelops a material which intumesces under the influence of heat.

From DE 2947593 is known a closing device for a pipe support means positioned on the outside of a fire partition. The device consists of a sleeve filled with a thermally expanding material, which when heated up will constrict and close the pipe.

In most of the solutions described above, the support means are sealed and finished after the ducts, pipes or cables are drawn through. This involves a considerably more complicated process than mounting the support means before the cables, pipes and ducts are installed. Furthermore, if the supporting devices are mounted afterwards, it will be difficult to obtain an adequate seal around the elements passing through the partition due to difficulties with centering, etc.

In addition, with regard to the known systems for passing pipes and ducts through walls, technical fire requirements stipulate that the ducts must be insulated for a length of 1 meter on each side of the fire partition, and pipes must be insulated for a length of 0.5 meter on each side of the fire partition. A disadvantage of this requirement is that the appearance of the pipe or duct may become rather unattractive aesthetically, in addition to the fact that such insulation may be relatively demanding in terms of space. Also, such additional insulation entails increased costs, as well as a risk that this work will not be carried out in accordance with regulations.

SUMMARY OF THE INVENTION

An objective of the present invention is to provide a fire retardant support means for pipes, ducts and cables which may be mounted in a fire partition before the cables, ducts or pipes are installed.

A further objective of the invention is to provide a fire retardant support means which permits the post-installation of cables, and which has a substantially better fire retardant effect than known devices.

Still another objective is to provide a fire retardant support means which enables the requirements for insulation of cables and pipes on each side of a fire partition to be reduced substantially.

Additional objectives and advantages of the fire retardant support means in accordance with the present invention will be apparent from the following detailed description.

This is achieved by means of a fire insulating support means of the type introduced above, which is characterized in that the flange-shaped body consists of a fire insulating material and optionally an outer metal jacket which at least partially surrounds the fire insulating material, and that in the platelike member in the flange-shaped body there is (are) provided one or more through holes for bolts, screws or similar fastening means for securing the body to the wall, and where at least partway around the hole there is disposed a thermally expanding mat.

Additional advantageous embodiment forms are disclosed in the dependent claims.

BRIEF DESCRIPTION OF THE DRAWINGS

The invention will be explained in more detail in the following with the aid of embodiment examples, with reference to the accompanying drawings.

DETAILED DESCRIPTION OF THE INVENTION

In the figures, like parts are identified with the same reference numbers in all the drawings.

Figure 1:
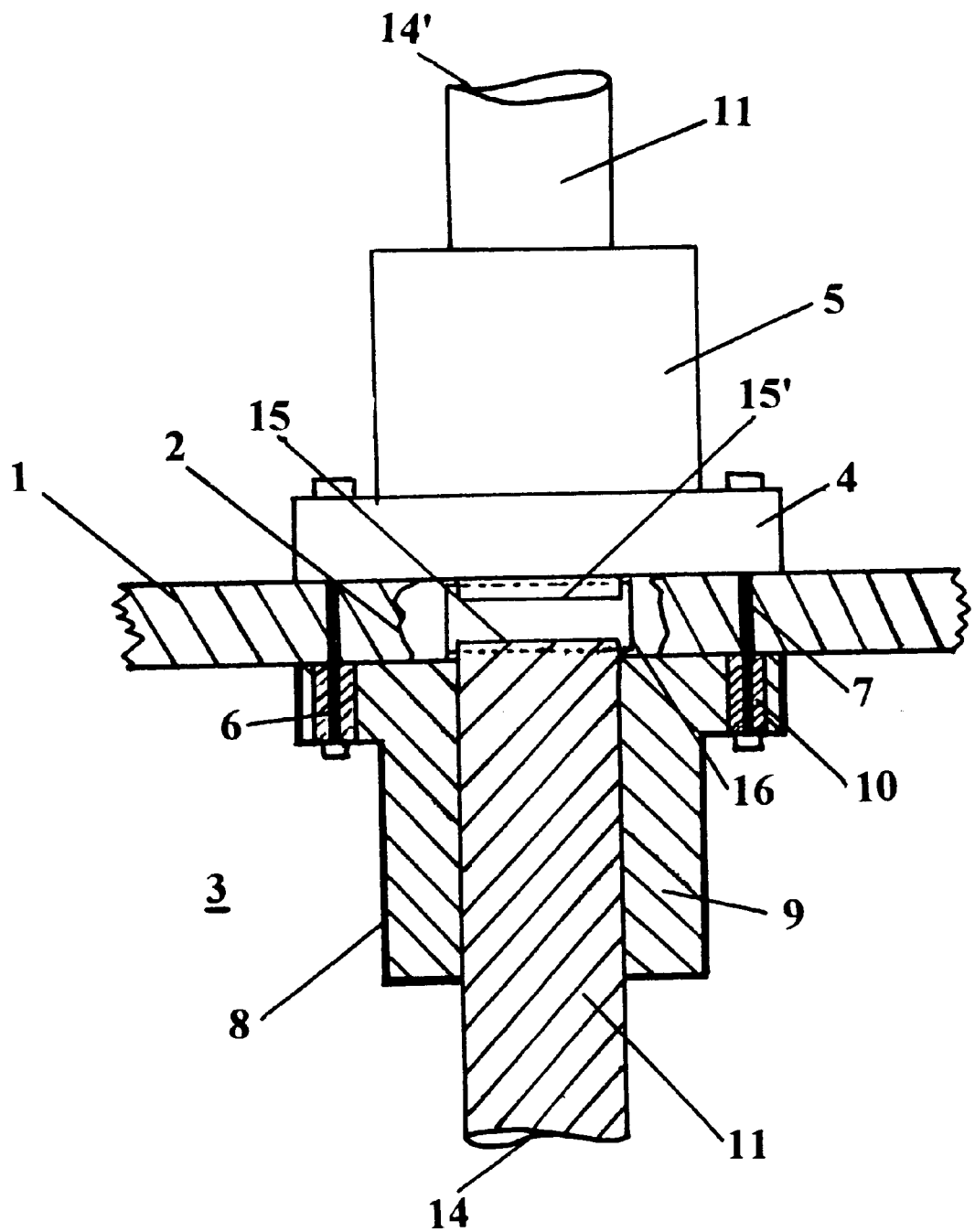
FIG. 1 illustrates a preferred embodiment of the device in accordance with the invention for supporting a ventilation duct passing through a partition.
Figure 2:
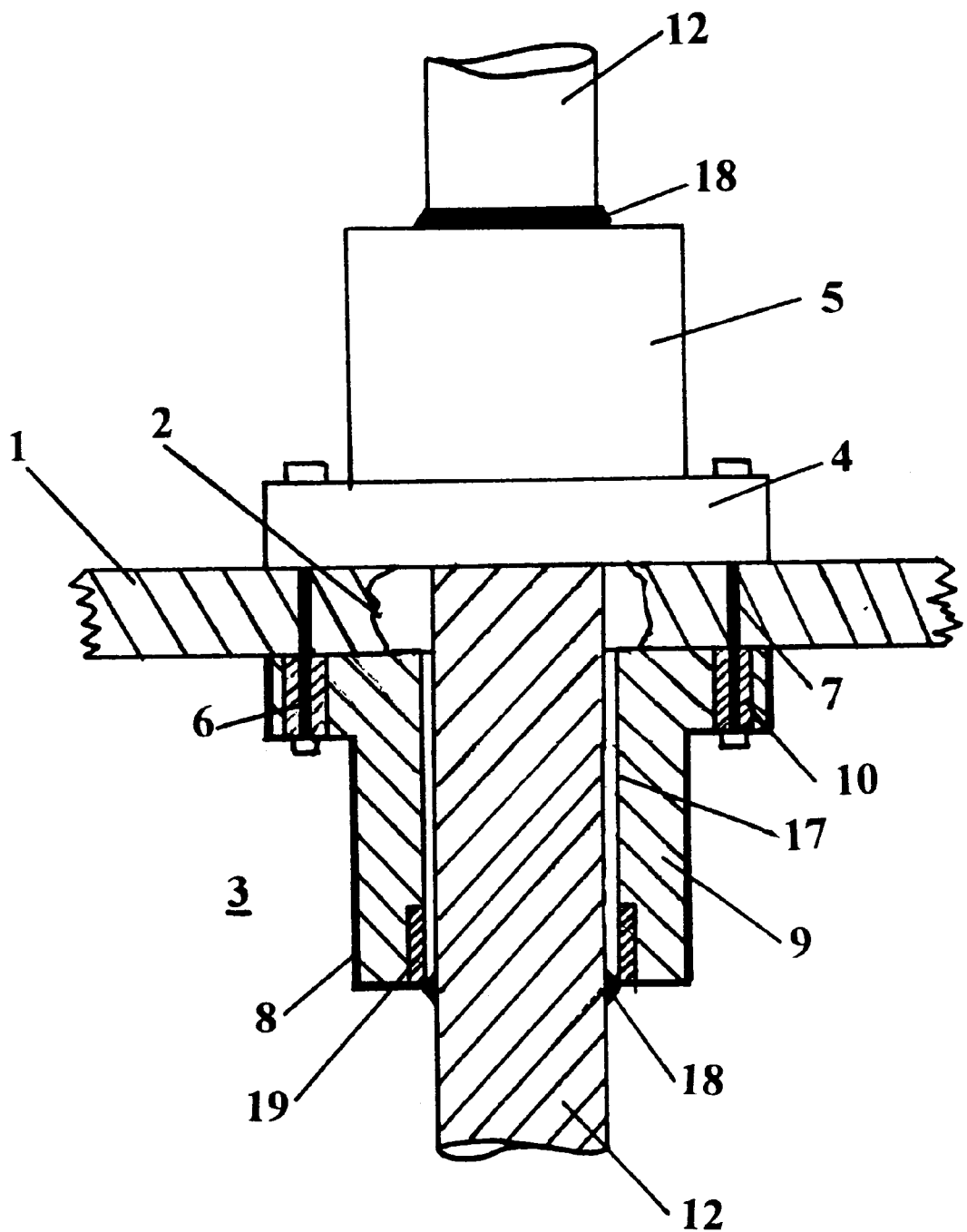
FIG. 2 illustrates a preferred embodiment of the device in accordance with the present invention for supporting a pipe passing through a partition.
Figure 3:
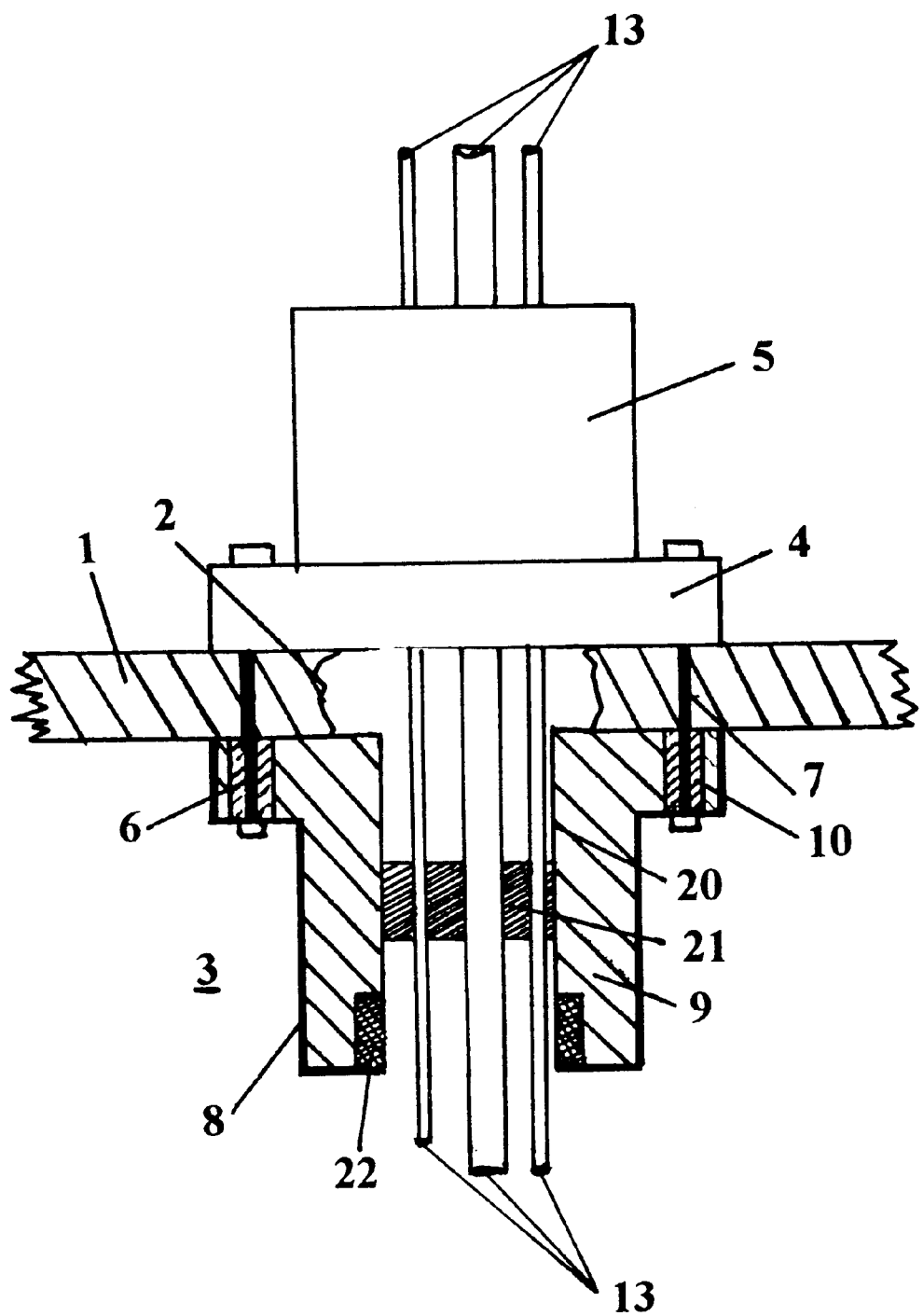
FIG. 3 illustrates a preferred embodiment of the device in accordance with the present invention for supporting cables and wires passing through a partition.

FIGS. 1, 2 and 3 show embodiment examples of the device in accordance with the present invention, where a device is positioned on each side of a wall 1 or similar structure having a through aperture 2. The upper portion of the drawings shows the device viewed from above, and the lower portion of the drawings shows an axial section through the device and the wall. The device consists of a flange-shaped body 3 having a platelike member 4 and a tubular member 5. In the platelike member 4 are provided through holes 6 for bolts 7 or other fastening means for securely attaching the flange-shaped body 3 to a wall or similar structure. The flange-shaped body 3 optionally consists of a metal jacket 8 and a fire insulating material 9. Alternatively, the flange-shaped body 3 may be made exclusively of a molded, fire insulating material, in which case the metal jacket 8 may be omitted.

The fire insulating material 9 may, for example, be of the type Conlit Brannstopp, which is produced by Ticon Gullhaug A/S, Lierstranda, Norway. Around the through holes 6 in the platelike member 4 is disposed an expanding mat 10. An example of an expanding mat that may be employed is 3M Brand Fire Barrier Moldable Putty, which is produced and marketed by 3M.

The platelike member 4 will abut with wall 1 and seal the through aperture 2. Because platelike member 4 consists of a fire retardant and insulating material, a temperature increase resulting from a fire on one side of wall 1 will be prevented from spreading to the opposite side of wall 1. The fire retardant and insulating material in the tubular member 5 will also prevent a temperature increase in the ventilation duct, pipe or cable, 11, 12 and 13, respectively, resulting from a fire on one side of wall 1, from being transmitted to the cable, pipe or ventilation duct 11, 12 and 13 on the opposite side of wall 1. The length of tubular member 5 may be adapted so that the temperature on the surface of ventilation duct 11, pipe 12 or cable 13, in the event of a fire on the other side of wall 1, will be prevented from exceeding certain limits, which are stipulated in accordance with technical fire regulations. If desired, a fireproof seal, e.g., fireproof silicon putty, may be inserted between platelike member 4 and wall 1.

The purpose of the expanding mat 10 around each bolt hole 6 is to prevent the spread of heat along bolts 7 in the event of a fire. When the temperature on one side of the wall rises, the expanding mat 10 will expand and form sealing contact with bolts 7. This prevents any fire gases from penetrating through holes 6 along bolt 7 to the other side of wall 1, as well as preventing the heat conducted through bolt 7 from spreading to the fire insulating material 9, thus enabling the temperature of that portion of the bolt situated on the other side of wall 1 to be kept relatively low.

FIG. 1 shows an embodiment form of the device for supporting a ventilation duct 11 passing through a partition. The ventilation duct 11 is cast permanently in the fire insulating material 9 and has one end 14, 14' which extends outward from tubular member 5 and one end 15, 15' which extends out from platelike member 4. The length of end 15, 15' which projects out of the platelike member 4 is equal to or less than half the thickness of wall 1. The other end 14, 14' of duct 11 is optionally provided with a standard coupling (not shown) for the attachment of additional ducts. To form a tight connection between the ends 15 and 15' of ducts 11, a tube 16 having an inside diameter approximately the same as the exterior diameter of ends 15, 15' and having a length smaller than or equal to the thickness of wall 1, is placed around the outside of the two duct ends 15, 15'.

In mounting the support means, as shown in FIG. 1, holes for bolts 7 are first drilled in wall 1, after a through aperture 2 has been made in wall 1. Then a device in accordance with the invention is placed on one side of wall 1. Bolts 7 are inserted through holes 6, and tube 16 is threaded over duct end 15 or 15'. Then a second device in accordance with the invention is placed on the other side of wall 1, so that bolts 7 project through holes 6, and duct end 15' or 15 is inserted into tube 16. The device is then secured to bolts 7 by means of nuts or the like.

Later, when the ventilation system is to be installed, duct ends 14, 14' are connected to the ventilation system with the aid of suitable couplings.

In FIG. 2 is shown an embodiment form of the invention for supporting pipes passing through a partition. The flange-shaped body 3, in the same manner as in the embodiment form shown in FIG. 1, comprises a platelike member 4, a tubular member 5, and through holes 6 in the platelike member 4 for bolts or other fastening means, which are surrounded by an expanding mat 10. The flange-shaped body 3 consists, as previously, of a fire insulating material 9 and optionally a metal jacket 8. The flange-shaped body 3 has a through aperture 17 having a diameter slightly larger than the diameter of pipe 12. The purpose of this is to enable a flange-shaped body 3 to be placed on each side of wall 1 before the pipe is drawn through, or a flange-shaped body 3 may be drawn onto a pipe, from the ends thereof, which has already been installed in aperture 2 in wall 1. In order to prevent gases from an incipient fire from penetrating through the device from one side of the wall to the other through the annular opening formed between pipe 12 and aperture 17, there is placed at the end of the flange-shaped body 3 and around pipe 12 a fire insulating sealant 18, e.g., a fire insulating silicon putty. This fire insulating sealant will also be capable of absorbing vibrations that occur, e.g., on ships and oil platforms. Further, in the wall at the end of the through aperture 17 is disposed an expanding mat 19. When the temperature of the device rises, as a result of fire on one side of wall 1, the expanding mat 19 will expand and seal the opening between pipe 12 and the inside of aperture 17. In this way the fire is prevented from spreading from one side of wall 1 to the other. An example of an expanding mat that may be employed in the present invention is described in U.S. Pat. Nos. 4,273,879 and 4,364,210 and is marketed under the name Interam® Heat Expanding Sheet FS-195 Series from 3M.

FIG. 3 shows an embodiment form of the device in accordance with the invention for supporting cables passing through a partition.

In this embodiment the flange-shaped body 3, in the same manner as in the embidiment form shown in FIGS. 1 and 2, comprises a platelike member 4, a tubular member 5, and through holes 6 for bolts or other fastening means in the platelike member 5, which are surrounded by an expanding mat 10. The flange-shaped body 3 consists, as previously, of a fire insulating material 9 and optionally a metal jacket 8. The flange-shaped body 3 has a through aperture 20 which may have, e.g., a circular or rectangular cross section.

In the wall of the through aperture 20 is disposed an expanding mat 22 which extends around the whole, or a part, of the circumference of aperture 20.

When the device is mounted on a wall 1 or similar structure, the cables and conduits 13 are drawn through the device and, to seal the through aperture 20, a fire insulating material 21, e.g., mineral wool, is inserted between the cables and conduits 13 and the wall of aperture 20. The purpose of the fire insulating material 21 is to prevent gas from fires from penetrating through the cable support means in the initial phase of a possible fire. In the event of a fire developing, the expanding mat 22 will expand as the temperature of the device rises, and it will seal the through aperture 20.

In addition to cables and conduits, this embodiment form may also be employed for pipes of small dimensions, e.g., instrument tubes.

Even though, in the description and the drawings, through bolts 7 are suggested, it might be more practical in certain situations to employ bolts which are, e.g., welded permanently to wall 1. This would be particularly applicable for cable supports used in bulkheads and the like.

What is claimed is:

1. A fire insulating support means for installation of one of cables, pipes and ventilation ducts in an aperture in a wall, which support means comprises a flange-shaped body, which flange-shaped body comprises a platelike member and a tubular member, and which flange-shaped body has an aperture therethrough for the placement of a duct, pipe or cable, wherein the flange-shaped body comprises a fire insulating material, and wherein the platelike member in the flange-shaped body is provided with at least one through hole for fastening means for securing the body to the wall, and where at least partway around the at least one through hole is disposed a thermally expanding mat.

2. A fire insulating support means in accordance with claim 1 in combination with a ventilation duct, wherein the support means is a device for passing ducts through a partition, and a tubular duct is cast in the through aperture of the flange-shaped body, which duct has at least one end adapted to extend at least partially into an aperture in a wall, and the duct has other ends which extend outside the tubular member of the flange-shaped body.

3. A fire insulating support means in accordance with claim 2, wherein the duct has two ends adapted to extend into the aperture in the wall and surrounding the two duct ends is disposed a connecting tube.

4. A fire insulating support means in accordance with claim 1, wherein the support means is a device for passing a pipe through a partition, and further comprising an additional thermally expanding mat adapted to at least partially surrounds a pipe passed through the aperture in the flange-shaped body, and a heat resistant seal at an end of the tubular member.

5. A fire insulating support means in accordance with claim 1, wherein the support means is a device for passing cables through a partition, and further comprising a second thermally expanding mat disposed in the wall of the through aperture in the flange-shaped body, and a thermally insulating material inserted inside the wall of the through aperture in the flange-shaped body adapted to provide a seal between the cables and the wall of the through aperture in the flange-shaped body.

6. A fire insulating support means in accordance with claim 5, wherein the expansion capability of the second thermally expanding mat is such that, on a temperature rise resulting from a fire, the second mat after having expanded will seal a void between the cables and the wall of the through aperture in the flange-shaped body.

7. A fire insulating support means in accordance with claim 1, wherein the flange-shaped body has a circular, oval, quadratic or rectangular cross section and that the through aperture has a circular, oval, quadratic or rectangular cross section.

8. A fire insulating support means in accordance with claim 2, wherein the flanged-shaped body has a circular, oval, quadratic or rectangular cross section and that the through aperture has a circular, oval, quadratic or rectangular cross section.

9. A fire insulating support means in accordance with claim 3, wherein the flanged-shaped body has a circular, oval, quadratic or rectangular cross section and that the through aperture has a circular, oval, quadratic or rectangular cross section.

10. A fire insulating support means in accordance with claim 4, wherein the flanged-shaped body has a circular, oval, quadratic or rectangular cross section and that the through aperture has a circular, oval, quadratic or rectangular cross section.

11. A fire insulating support means in accordance with claim 5, wherein the flanged-shaped body has a circular, oval, quadratic or rectangular cross section and that the through aperture has a circular, oval, quadratic or rectangular cross section.

12. A fire insulating support means in accordance with claim 6, wherein the flanged-shaped body has a circular, oval, quadratic or rectangular cross section and that the through aperture has a circular, oval, quadratic or rectangular cross section.

13. A fire insulating support means in accordance with claim 1, further comprising an outer metal jacket which at least partially surrounds the fire insulating material.

14. A fire insulating support means in accordance with claim 4, wherein the heat resistant seal is made of heat resistant silicon putty.

15. A fire insulating support means in accordance with claim 5, wherein the thermally insulated material is mineral wool.

* * * * *